2,999,838
POLYMERIC COMPOSITIONS AND SHAPED
STRUCTURES THEREOF
James Maurice Quinn, Tonawanda, N.Y., and Allan Kenneth Schneider, Wilmington, Del., assignors to E. I. du Pont de Nemours and Company, Wilmington, Del., a corporation of Delaware
No Drawing. Filed Mar. 4, 1959, Ser. No. 797,045
9 Claims. (Cl. 260—45.7)

This invention relates to the manufacture of shaped articles of polymeric halogenated hydrocarbons. More specifically, it relates to the stabilization of the polymeric halogenated hydrocarbons, particularly above their melting temperatures, for successful shaping into articles.

The invention will be described as it applies to polyvinyl chloride or copolymers of vinyl chloride having vinyl chloride as the major constituent, and their formation into films for use in packaging applications and the like. However, the invention is equally applicable to polymers and copolymers of vinyl fluoride and may be extended to include all polymeric materials whose thermal decomposition is at least partially attributed to the loss of halogen acid from the composition, thereby leading to discoloration; and the shaping of these polymeric materials into films, filaments, fibers, foils, coatings, etc. Besides polyvinyl chloride and polyvinyl fluoride, the invention applies to such polymeric materials as vinylidene chloride polymers, vinylidene chloride-vinyl chloride copolymers, vinylidene chloride-acrylonitrile copolymers, vinylidene fluoride polymers and copolymers, afterchlorinated polyvinyl chloride, chloroprene polymers, chlorosulfonated polyethylene, and the like.

Polyvinyl chloride is characterized by poor thermal stability, particularly at temperatures above its melting point. Thermal decomposition is evidenced by a browning of the normally white polymer. As degradation continues the polymer becomes progressively darker until charring and substantial degradation occur. This lack of thermal stability presents a serious obstacle to the commercial exploitation of the polymer since the preferred methods of forming shaped structures involve the use of heat.

The object of the present invention is a substantially stabilized polymer that can be formed into shaped structures at elevated temperatures, e.g., by melt or plasticized extrusion, rolling, coalescence or solvent casting, without encountering the aforementioned difficulties. A further object is a polyvinyl chloride composition that can easily be melt-extruded into a useful film. Other objects will appear hereinafter.

The objects are accomplished by a composition of matter comprising the halogenated hydrocarbon polymer and at least one substituted 6-methylene 1,2,3,4,5,6,7,8-octahydronaphthalene.

The preferred halogenated hydrocarbon polymers are those in which the halogen has an atomic weight of 19–36.

The stabilizer compounds for use in the compositions of this invention are derivable, at least in part, from allene and contain two non-aromatic closed ring structures, carbocyclic groups, having one methylene group pendant to one of the cyclic groups. Being derivable from allene ($C_3H_4$), this compound contains a grouping having the formula $C_3xH4x-y$, where $x$ is an integer equal to the effective degree of polymerization of allene represented by the grouping and $y$ represents the degree of substitution upon the basic grouping.

The specific group of compounds falling within the generic definition of stabilizer compounds useful in this invention are substituted 6-methylene 1,2,3,4,5,6,7,8-octahydronaphthalenes of the general formula:

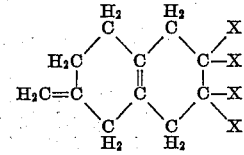

where at least one of the X's is a group containing a multiple linkage alpha to the ring carbon, e.g., carbomethoxy or cyano, the others being hydrogen or hydrocarbon groups. More specifically, one X should be a group selected from the class consisting of —CN, —NO₂, —CHO, —COR, —COOH, —COOR, —CONH₂, —COCl, —SO₂R, —C₆H₅, —CH=CH₂, and, together with one X in the adjacent carbon atom,

—CO—O—CO—

R in said groups being hydrocarbon free from aliphatic unsaturation of not more than 6 carbon atoms, and the other X's should be selected from the class consisting of hydrogen, cyano and hydrocarbon groups free from aliphatic unsaturation and having from 1 to 6 carbon atoms. These compounds and their preparation are disclosed and claimed in copending U.S. patent application Serial No. 617,236 filed October 22, 1956, now U.S. Patent No. 2,894,936, to R. E. Benson and assigned to the assignee of the present invention. These compounds may be prepared by the reaction of the allene trimer 1,3,4-trimethylenecyclohexane with dienophilic alpha, beta-unsaturated compounds such as methyl acrylate, methyl methacrylate, acrylonitrile, tetracyanoethylene, etc.

The compounds used as stabilizers in the compositions of this invention all have a normal boiling point of at least about 160° C. Hence, they remain present at the temperatures ordinarily used in preparing shaped structures of polyvinyl chloride by melt extrusion of substantially unplasticized polymer.

The process for forming shaped structures involves blending a mixture of the halogenated hydrocarbon polymer and at least one of the stabilizer compounds specified previously; then heating the mixture until it is converted into a homogeneous single phase composition; and, thereafter, forming the homogeneous single phase into a shaped structure and cooling the structure.

The amount of the stabilizer used, particularly for the melt-extrusion of polyvinyl chloride films, should be enough to provide adequate thermal stability during the forming operation but not enough to affect the properties of the resulting film adversely. Concentrations of at least 1% of the stabilizer, based on the weight of the stabilizer plus polymer, have been found most useful. The maximum used will depend on the process of forming the shaped structures. However, the maximum concentration of the stabilizer remaining in the ultimate product is preferably no greater than 15%. For extrusion operations where only a minor portion of the stabilizer would be lost by evaporation during the forming operation, up to 15% may therefore be used in the starting mixture. In solvent casting, dispersion coalescence, or plasticized extrusion, where a larger proportion of the stabilizer may be evaporated during formation of the shaped structure, a still higher concentration, e.g., up to 25%, may be used in the starting composition.

Besides improving thermal stability and lowering the melt viscosity of the polymeric halogenated hydrocarbons, the stabilizer compounds of the compositions of this invention provide other advantages. They are compatible with the polymers over a wide range of compositions and therefore can be easily mixed uniformly with the polymers; also they show no tendency to exude to the surface of the ultimately produced polymeric articles. Thus, they do not interfere with post-processing operations such as the printing of films produced from these compositions. These compounds are essentially insoluble in water so that the final articles (films, filaments and the like) are not rendered water-sensitive by their presence. Most important, however, the films produced from these compositions are substantially clear and colorless, being virtually bubble-free and particle-free.

Specific embodiments falling within the definition of the process and composition of the invention will be apparent from the following examples. It is understood that the examples should not be considered to limit the scope of the present invention. In the examples, all parts are by weight unless otherwise specified.

EXAMPLES 1–3

A mixture consisting of 90 parts of a polyvinyl chloride resin (the resin having an inherent viscosity of 1.21 deciliters per gram measured at 0.25% concentration in hexamethylphosphoramide at 30° C.) and 10 parts of reaction products of 1,2,4-trimethylenecyclohexane with various alpha, beta-unsaturated compounds specified below, was prepared by ball milling the ingredients together for 60 minutes. A one gram sample of each mixture was pressed for 6 minutes between ferrotype plates under a total force of 30 tons in a Carver laboratory press heated to 210° C. The pressure was released and the resulting film was removed from between the plates. In each case, transparent, particle-free films were obtained, having only partial discoloration when viewed in 10 mil thickness against a source of white light. The results of this work are summarized in the following table, Table I.

Table I

STABILIZATION WITH THE REACTION PRODUCTS OF 1,2,4-TRIMETHYLENECYCLOHEXANE AND ALPHA, BETA-UNSATURATED COMPOUNDS

| Example | Compound |
| --- | --- |
| 1 | Reaction product of 1,2,4-trimethylenecyclohexane with methyl methacrylate.[1] 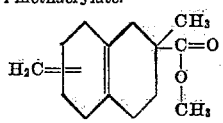 |
| 2 | Reaction product of 1,2,4-trimethylenecyclohexane with methyl acrylate.[1] 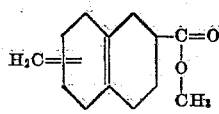 |
| 3 | Reaction product of 1,2,4-trimethylenecyclohexane with maleic anhydride.[1] 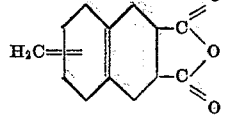 |

[1] The position of the methylene group was not uniquely determined.

As a control, the stabilizer was omitted. A one gram sample of the same polyvinyl chloride resin as above was pressed between ferrotype plates under a total force of 30 tons at 210° C. for only four minutes. When examined, the sample had been converted to a brownish-black, charred, nearly opaque film containing numerous black particles.

The compositions of this invention are useful in the preparation of shaped structures of all types. They are extremely useful in preparing films, filaments, fibers, foils and the like and as coatings for wood, metals, etc. However, their greatest utility is in the formation of self-supporting films for packaging applications. These films may be fabricated into sheets, envelopes or tubes and used to package foodstuffs, textiles, hardware items, greased or untreated machine parts and similar materials. In sheet form the film may be used as a base for adhesive tape, sound recording tape, etc.

The invention contemplates the use of the substituted 6-methylene 1,2,3,4,5,6,7,8-octahydronaphthalenes as the essential additives to polymeric compositions. These compounds may be used singly or in mixtures thereof. The present invention also contemplates the use of other ingredients along with the essential additives provided such ingredients do not detract from the function of the additives. Thus, the addition of pigments, dyes, delusterants, plasticizers, latent solvents, fillers, lubricants, additional thermal stabilizers, photo stabilizers, etc., in suitable amounts is understood to be within the purview of this invention.

Having fully disclosed the invention, what is claimed is:

1. A composition of matter comprising polyvinyl chloride and 1–15% of at least one stabilizing compound selected from the group consisting of the reaction product of 1,2,4-trimethylenecyclohexane with methyl methacrylate, the reaction product of 1,2,4-trimethylenecyclohexane with methyl acrylate and the reaction product of 1,2,4-trimethylenecyclohexane with maleic anhydride.

2. A composition of matter as in claim 1 wherein said stabilizing compound is the reaction product of 1,2,4-trimethylenecyclohexane with methyl methacrylate.

3. A composition of matter as in claim 1 wherein said stabilizing compound is the reaction product of 1,2,4-trimethylenecyclohexane with methyl acrylate.

4. A composition of matter as in claim 1 wherein said stabilizing compound is the reaction product of 1,2,4-trimethylenecyclohexane with maleic anhydride.

5. A process for forming shaped structures which comprises blending a mixture of polyvinyl chloride and 1–25% of at least one stabilizing compound, said stabilizing compound being selected from the group consisting of the reaction product of 1,2,4-trimethylenecyclohexane with methyl methacrylate, the reaction product of 1,2,4-trimethylenecyclohexane with methyl acrylate and the reaction product of 1,2,4-trimethylenecyclohexane with maleic anhydride; heating said mixture to convert the mixture into a homogeneous single phase composition; forming said composition into a shaped structure and cooling said structure.

6. A process for forming a self-supporting film which comprises blending a mixture of polyvinyl chloride and 1–25% of at least one stabilizing compound, said stabilizing compound being selected from the group consisting of the reaction product of 1,2,4-trimethylenecyclohexane with methyl methacrylate, the reaction product of 1,2,4-trimethylenecyclohexane with methyl acrylate and the reaction product of 1,2,4-trimethylenecyclohexane with maleic anhydride; heating said mixture to convert the mixture into a homogeneous single phase composition; extruding said composition in the form of a film and cooling said film.

7. A process as in claim 6 wherein said stabilizing compound is the reaction product of 1,2,4-trimethylenecyclohexane with methyl methacrylate.

8. A process as in claim 6 wherein said stabilizing compound is the reaction product of 1,2,4-trimethylenecyclohexane with methyl acrylate.

9. A process as in claim 6 wherein said stabilizing compound is the reaction product of 1,2,4-trimethylenecyclohexane with maleic anhydride.

No references cited.